(12) United States Patent
Winker et al.

(10) Patent No.: US 7,768,703 B2
(45) Date of Patent: Aug. 3, 2010

(54) DUAL FIELD OF VIEW SIGHTING SYSTEM

(75) Inventors: Bruce K. Winker, Ventura, CA (US); Milind Mahajan, Thousand Oaks, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 295 days.

(21) Appl. No.: 11/899,296

(22) Filed: Sep. 4, 2007

(65) Prior Publication Data
US 2009/0052023 A1     Feb. 26, 2009

Related U.S. Application Data

(60) Provisional application No. 60/842,734, filed on Sep. 6, 2006, provisional application No. 60/841,992, filed on Sep. 1, 2006.

(51) Int. Cl.
*G02B 23/14* (2006.01)

(52) U.S. Cl. .................. 359/432; 359/421; 359/813; 359/822

(58) Field of Classification Search .............. 359/421, 359/813, 822, 432
See application file for complete search history.

(56) References Cited

U.S. PATENT DOCUMENTS

| 3,712,702 | A | * | 1/1973 | Schmidt | 313/524 |
| 5,140,151 | A |   | 8/1992 | Weiner et al. | 250/213 VT |
| 5,793,528 | A |   | 8/1998 | Wallace et al. | 359/419 |
| 6,061,945 | A |   | 5/2000 | Wallace et al. | 42/101 |
| 6,295,170 | B1 |  | 9/2001 | Wallace et al. | 359/813 |
| 6,520,643 | B1 | * | 2/2003 | Holman et al. | 353/20 |
| 2006/0055891 | A1 | * | 3/2006 | Florence et al. | 353/20 |
| 2007/0159701 | A1 |   | 7/2007 | Campbell et al. | |

* cited by examiner

*Primary Examiner*—Joshua L Pritchett
(74) *Attorney, Agent, or Firm*—Koppel, Patrick, Heybl & Dawson

(57) ABSTRACT

A dual field of view sighting system uses liquid crystals, flip-polarizers and/or flip-mirrors to select between at least two fields of view.

38 Claims, 17 Drawing Sheets

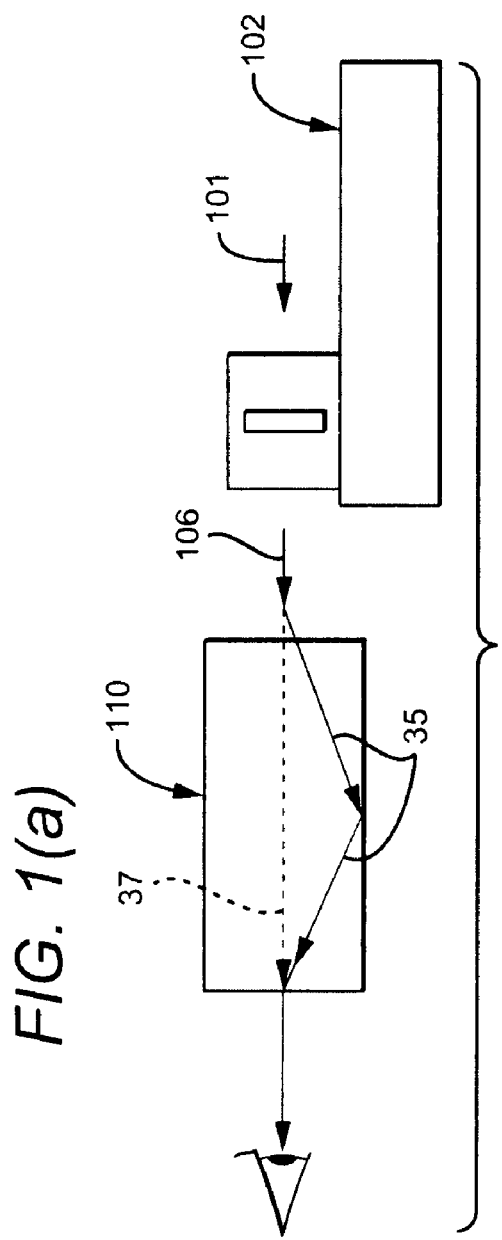
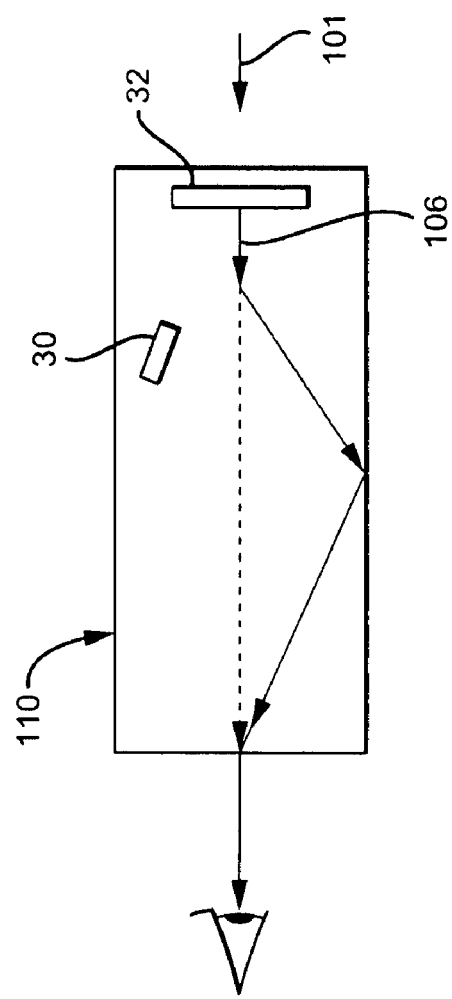
FIG. 1(a)
FIG. 1(b)

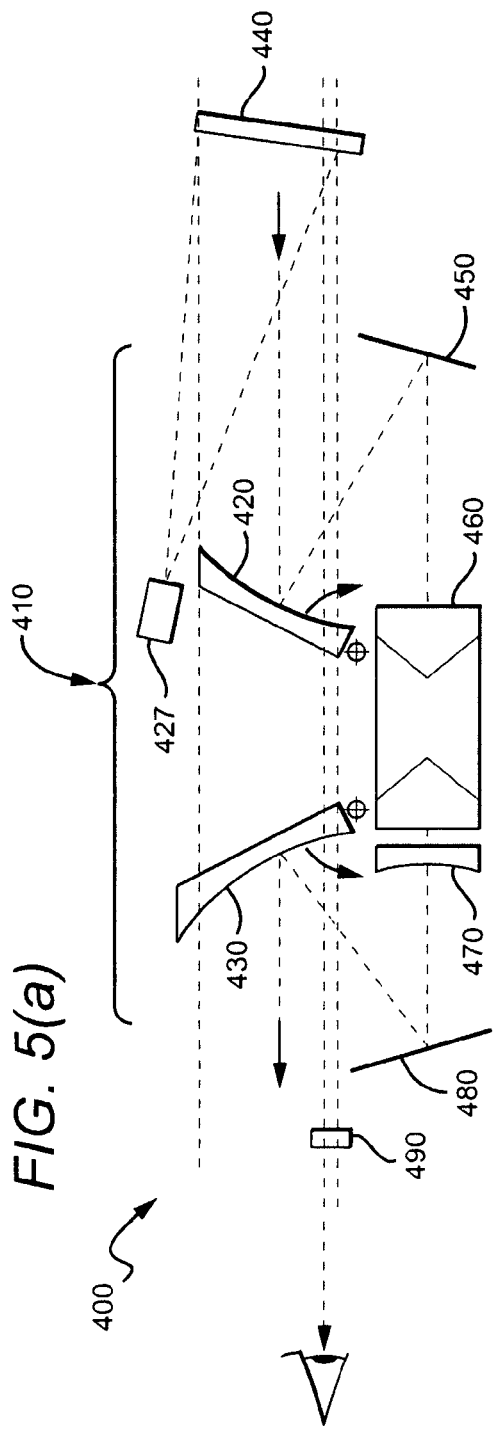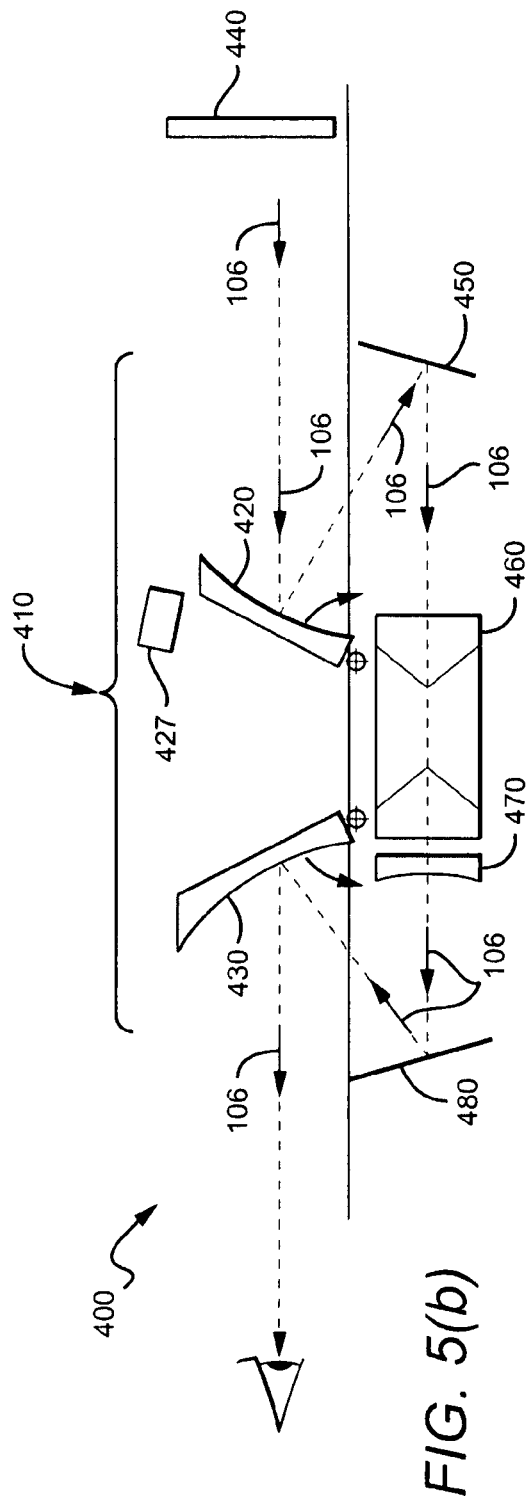

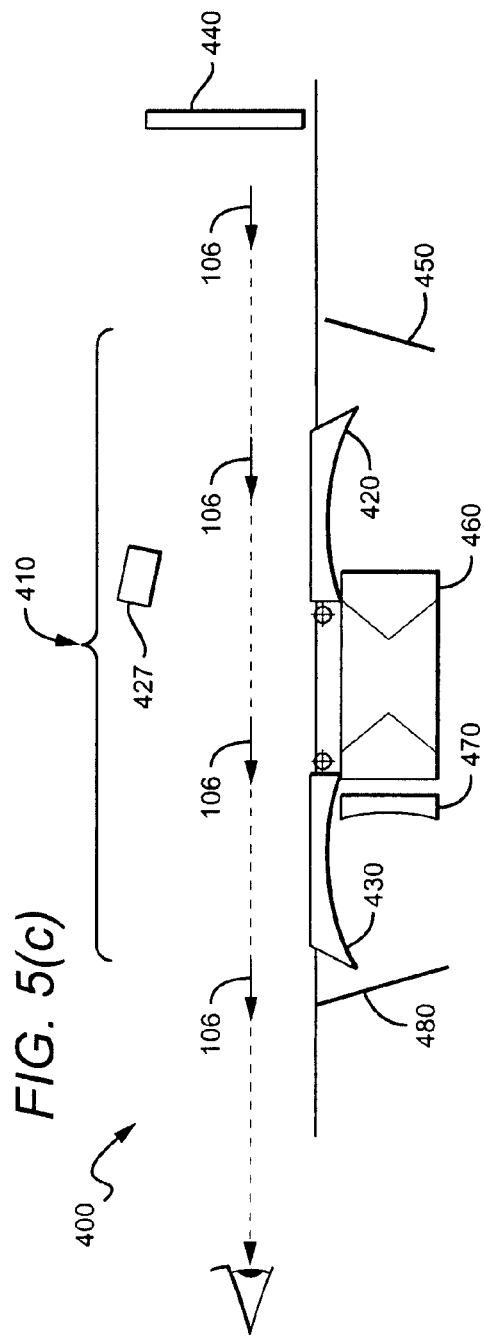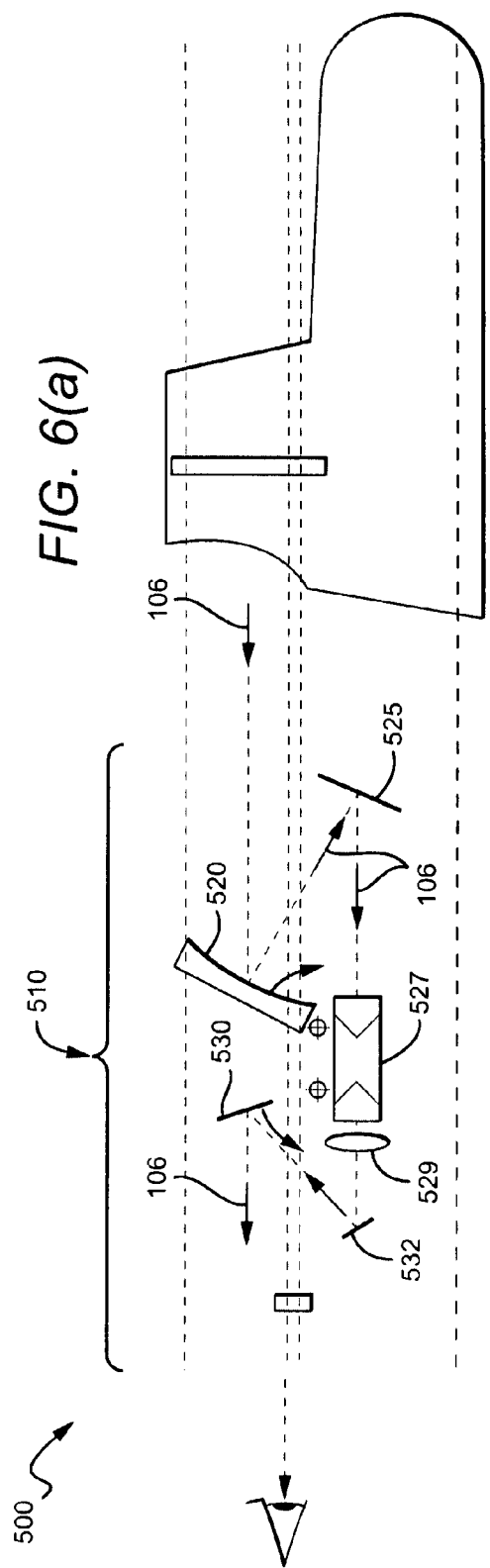

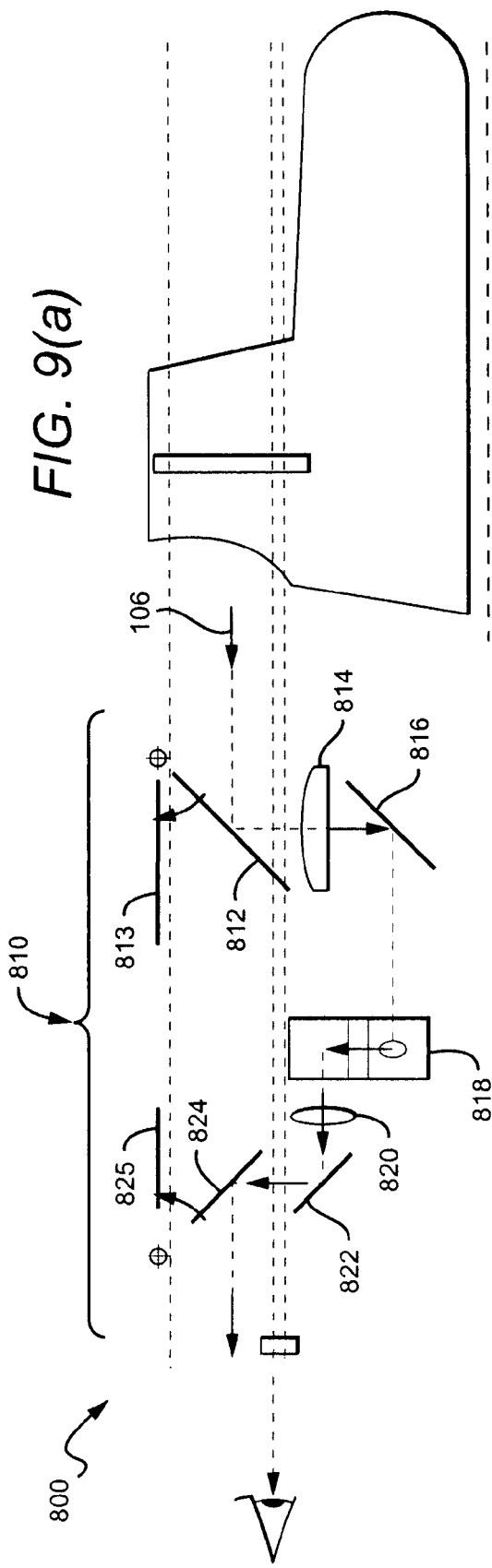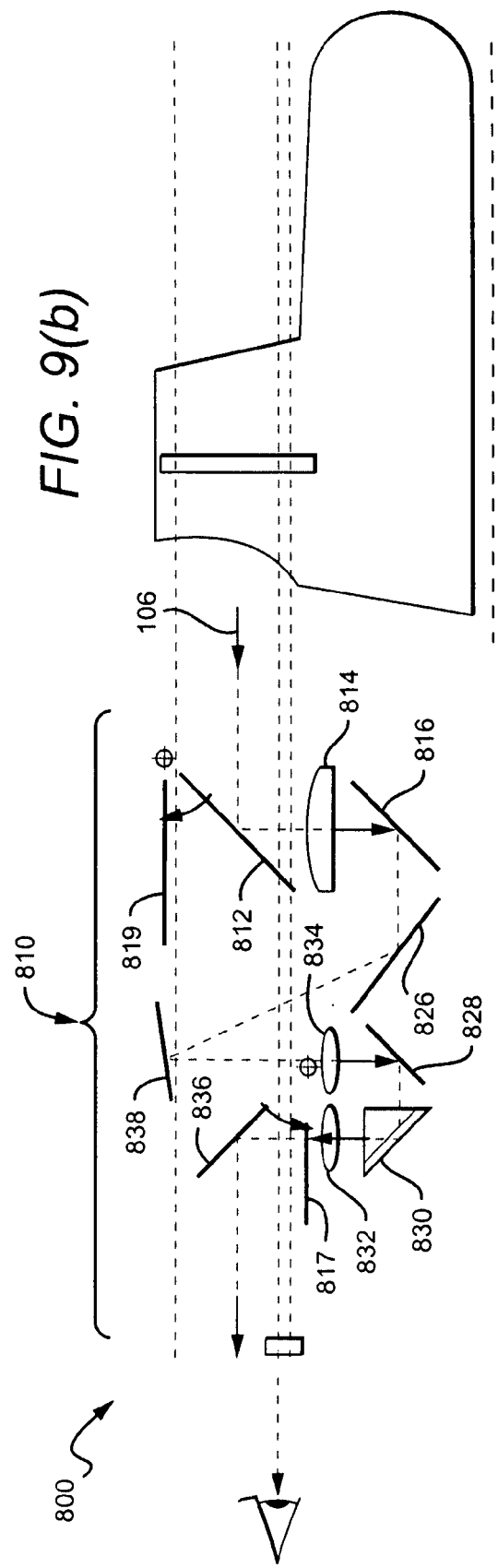

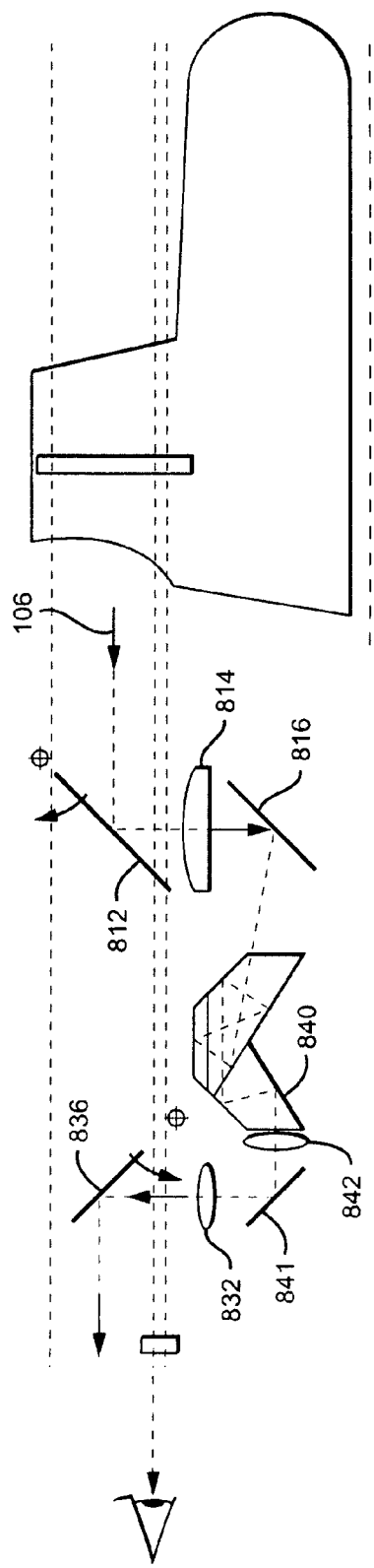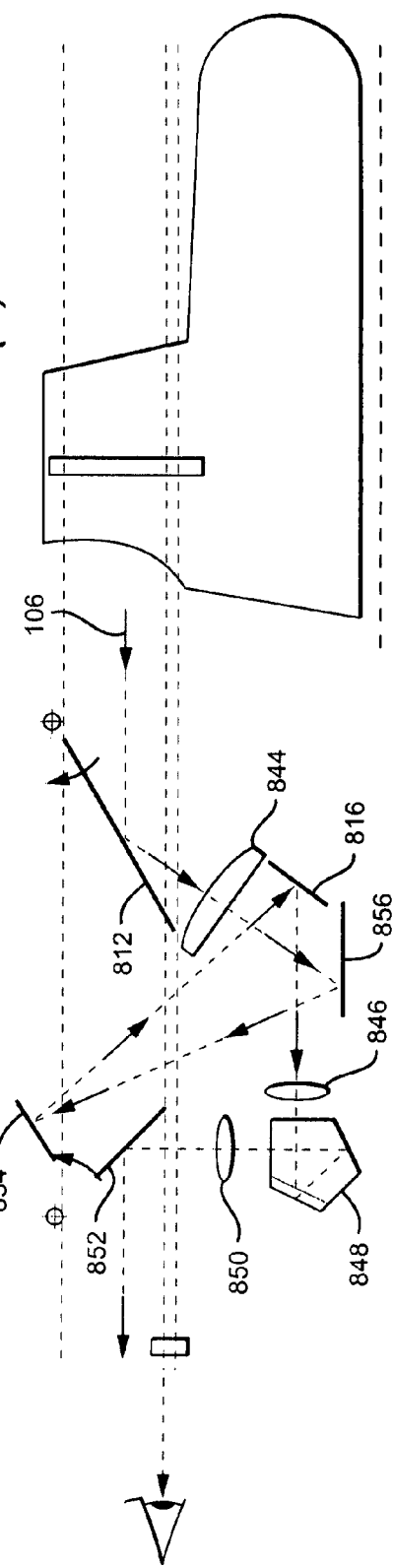

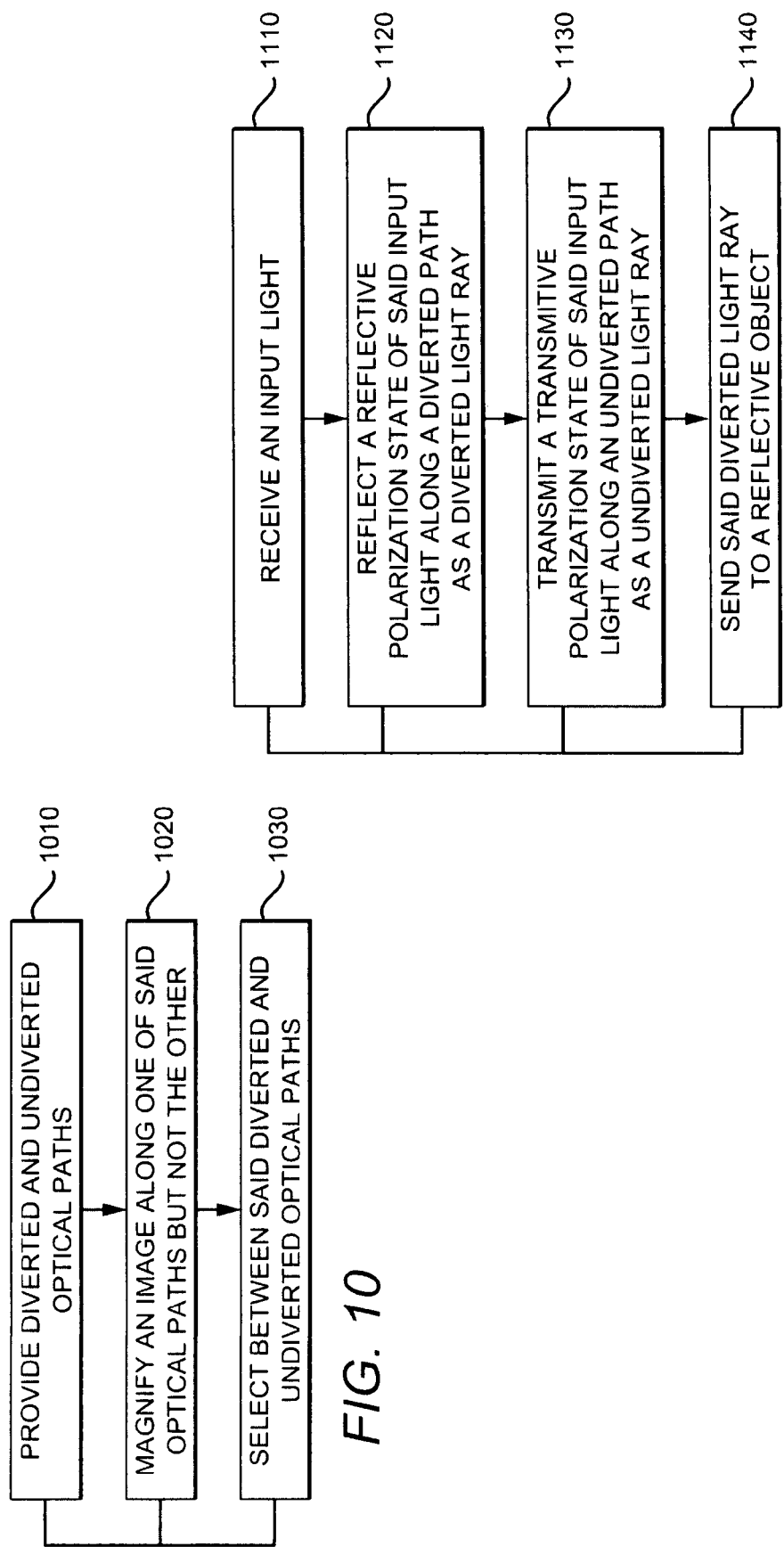

DUAL FIELD OF VIEW SIGHTING SYSTEM

This application claims the benefit of provisional patent application No. 60/841,992 to Winker, filed Sep. 1, 2006, and of provisional patent application No. 60/842,734 to Winker, filed Sep. 6, 2006.

BACKGROUND OF THE INVENTION

1. Field of the Invention

This invention relates to providing a dual field of view sighting system.

2. Description of the Related Art

Conventional sighting systems used on a rifle or other visual targeting apparatus have advanced optical sights that enable precise aiming despite movement of the observer's eye.

For close quarter targeting, the preferred sight is the holographic or reflex "red dot" sight. This red dot sight projects an illuminated reticle that is visible to the observer with both eyes open. Because this sight is used for close quarter targeting, it produces no magnification and thus displays no telescope artifacts, while providing an unobstructed field-of-view, unlimited eye relief, a large exit pupil, and no parallax.

For precision aiming at distant targets, the preferred sight is the 3-5× magnification telescope, which provides a minimum 5 mm exit pupil, an illuminated aiming reticle, and fine azimuth and elevation adjustments.

Red dot and telescope sights are typically sold separately as off-the-shelf components for mounting onto a rifle. Variable zoom telescopes available for precision aiming at distant targets usually provide 1× to 4× zoom capabilities.

One disadvantage of using a telescope alone is it does not provide for zero zoom (0×). Absence of magnification elements in the optical path distinguishes 0× from 1×. This prohibits its use for close quarter battles, where a wide field of view and no magnification is desired. Another disadvantage of the telescope is it requires that the user let go of the rifle for changing zoom modes, thus delaying acquisition of a target. Another disadvantage is the inability to view a Back Up Iron Sight ("BUIS"), which provides manual targeting through the sight. Additionally, fixed exit pupil sizes are too small for close quarter targeting.

To overcome these inherent telescope limitations, some manufacturers mount a rotating 3× telescope in front of the red dot sight. This arrangement allows the user to physically rotate the telescope in and out of the field of view for switching between close quarter targeting and precision distance aiming modes. For close quarter targeting, the telescope is rotated to the "down" position, so it is outside the field of view. This gives the user 0× zoom since the telescope is not positioned to magnify the incoming light. For precision aiming, the telescope is rotated to the "up" position, allowing it to intercept and magnify the light before it reaches the user's eye, thereby providing 4× zooming.

There are several disadvantages to this arrangement. First, changing modes still requires the user to let go of the rifle. Secondly, the rotating mechanism is a large, heavy external moving part. This not only adds size, weight and inconvenience, it also adds to the cost and complexity of the system.

SUMMARY OF THE INVENTION

The present invention as embodied in the claims provides a dual field of view sighting system using liquid crystals, flip-polarizers and/or flip-mirrors.

One aspect of the invention provides a light path selection mechanism that receives input light and, in a first mode, outputs an undiverted light along an undiverted optical path and, in a second mode, diverts the input light to output a diverted light along a diverted optical path, and a magnification system positioned to magnify an image along one of the optical paths but not the other optical path.

Another aspect of the invention provides a polarizer for receiving input light and outputting a diverted light having a first polarization state and a transmitted light having a second polarization state; a broadband quarter-wave plate for receiving the diverted light from the polarizer and outputting the diverted light with a circular polarization state; and a concave spheroid mirror positioned to receive and reflect the diverted light back to the quarter-wave plate. The quarter-wave plate converts the circular polarization state of the diverted light to the second polarization state for transmission through the polarizer.

Another aspect of the invention provides diverted and undiverted optical paths, with magnifying an image along one of the optical paths but not the other, and selecting between the diverted and undiverted optical paths.

Another aspect of the invention provides receiving input light, reflecting a reflective polarization state of the input light along a diverted path as a diverted light ray, transmitting a transmitive polarization state of the input light along an undiverted path as an undiverted light ray, and sending the diverted light ray to a reflective objective.

BRIEF DESCRIPTION OF THE DRAWINGS

FIGS. 1(a) and 1(b) are schematic diagrams illustrating one potential embodiment of a dual field of view sighting system that uses either an internal or external red dot sight.

FIGS. 5(a), 5(b) and 5(c) are schematic diagrams illustrating off-axis flip spheroids for selecting a field of view.

FIGS. 6(a), 6(b), and 7 are schematic diagrams illustrating a flip-mirror and off-axis flip spheroid for selecting a field of view.

FIGS. 8, 9(a), 9(b), 9(c) and 9(d) are schematic diagrams illustrating flip-mirrors for selecting a field of view.

FIG. 10 is a flow diagram showing a method for selecting a field of view.

FIG. 11 is a flow diagram showing a method for providing an optical subsystem.

DETAILED DESCRIPTION OF THE INVENTION

Figure 2A:
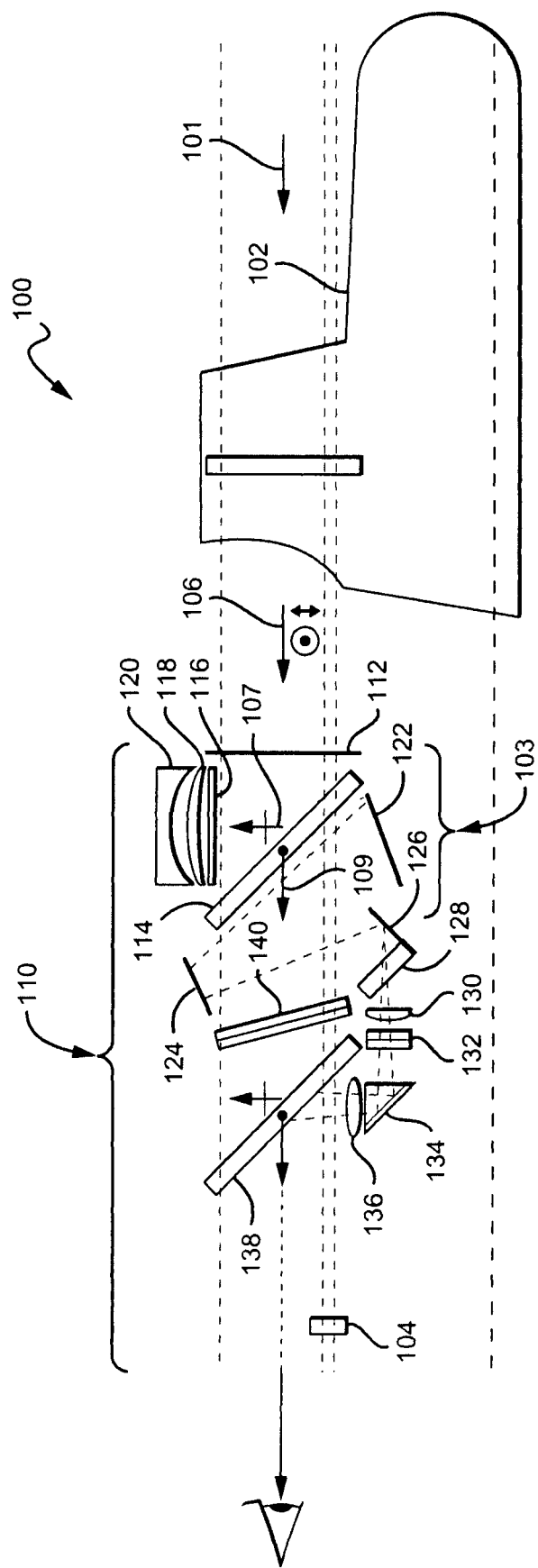
FIGS. 2(a), 2(b) and 2(c) are schematic diagrams illustrating one potential embodiment of a dual field of view sighting system that uses liquid crystals to select the field of view.

The present invention, as embodied in the claims, provides a dual field of view sighting system using liquid crystals, flip-polarizers and/or flip-mirrors.

The term "quarter-wave plate" or "wave plate" as used herein refers to a wave plate that operates across a broad spectral range, and is not limited to quarter-wave plates that operate only at a particular wavelength. Additionally, the term "lens" as used herein can mean a single lens, or several different lens elements that work together. "Activating" the liquid crystal includes changing the orientation of the liquid crystal's optical axis. Furthermore, the term "light" is not limited to the visible spectrum.

The term "flip" preferably refers to any type of mechanical motion, including, but not limited to, rotation about any axis in any plane, and/or mechanical translation in any direction, and/or any combination of rotation and translation thereof. The term "ocular" may also be referred to as an "eyepiece".

FIG. 1(a) shows one embodiment of a dual field of view sighting system that comprises external red dot sight 102, input light rays 101 and 106, and housing 110. In the example shown, housing 110 preferably contains various elements that create at least two light paths, depicted, for example, by transmitted light ray 37 and diverted light ray 35. One of these rays may be sent through a magnification system to produce a magnified field of view, while the image produced by the other ray is preferably not magnified. The housing 110 preferably also contains a switching mechanism (not shown) that allows a viewer to select between the two light paths and thus the field of view. The same elements that provide the light paths may also provide the switching mechanism. FIG. 1(b) shows a variation of FIG. 1(a) in which the red dot sight comprising elements 30 and 32 is located inside housing 110 instead of outside, providing a more compact design. The light paths depicted in 1(a) and 1(b) are shown only for illustrative purposes; the actual path taken can vary greatly, depending on the elements used within the housing to provide and select between the light paths. Additionally, neither or both of the paths can be magnified.

FIG. 2(a) shows another embodiment of a dual field of view sighting system that uses activatable liquid crystals and polarizers to select between two fields of view. The sighting system 100 includes housing 110, which contains a light path selection system for selecting between two light paths, and a magnification system to magnify only the light transmitted along one of the light paths. Electrically/manually rotatable half-wave plate 112 can also be optionally included for glare reduction.

In this embodiment, the magnification system preferably comprises a reflective objective spheroid 120 to provide magnification, aberration corrector 118 to correct the image aberrations caused by the spheroid mirror, aberration corrector 128 to correct image aberrations caused by the convergent light path through tilted polarizers, optional field lens 130, prism 134, and ocular 136, which can move to adjust the focus. Prism 134 is preferably an Amici Roof prism, although other prisms with other mirror combinations are also contemplated. Other lenses and optical elements may also be included.

Figure 2B:
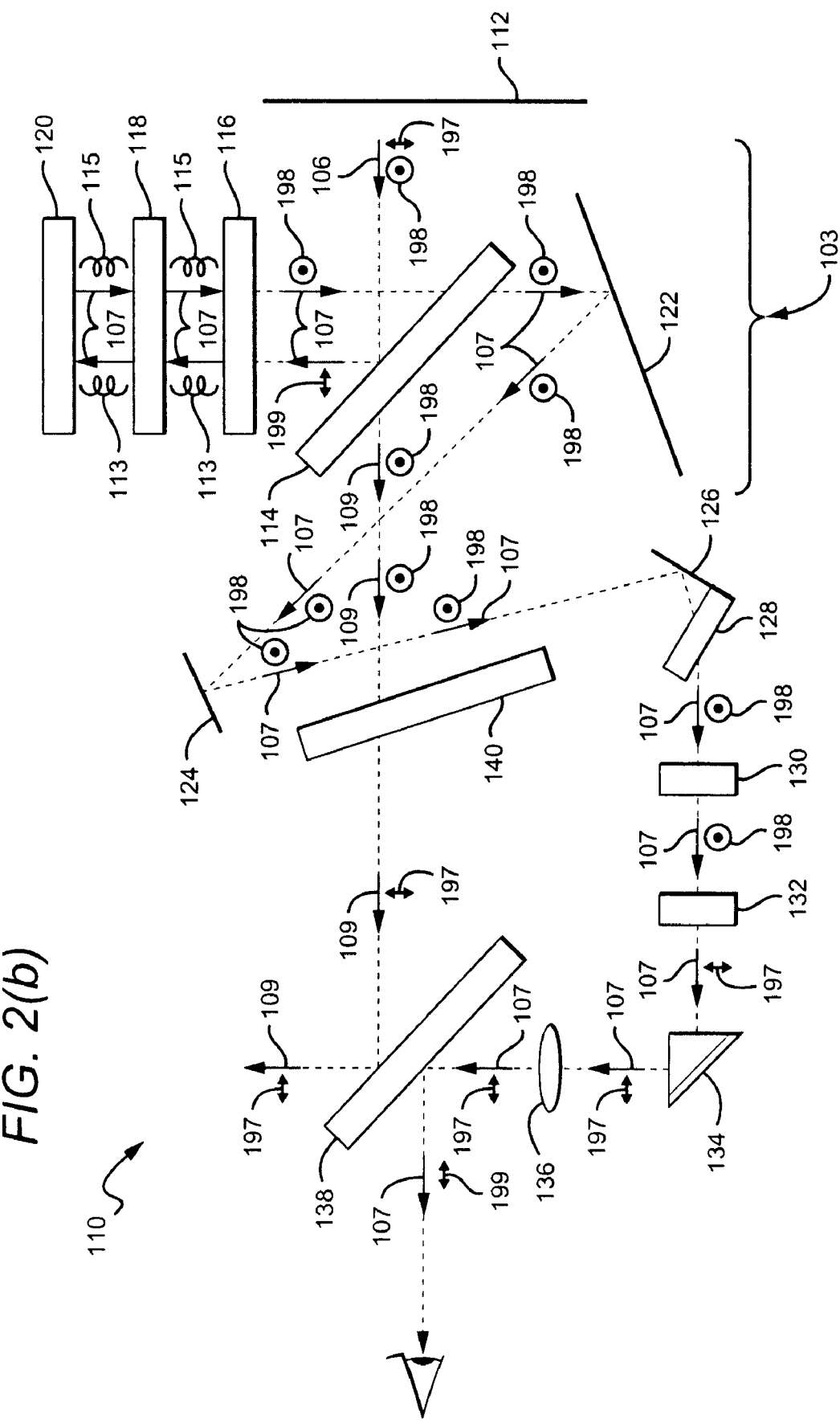
Figure 2C:
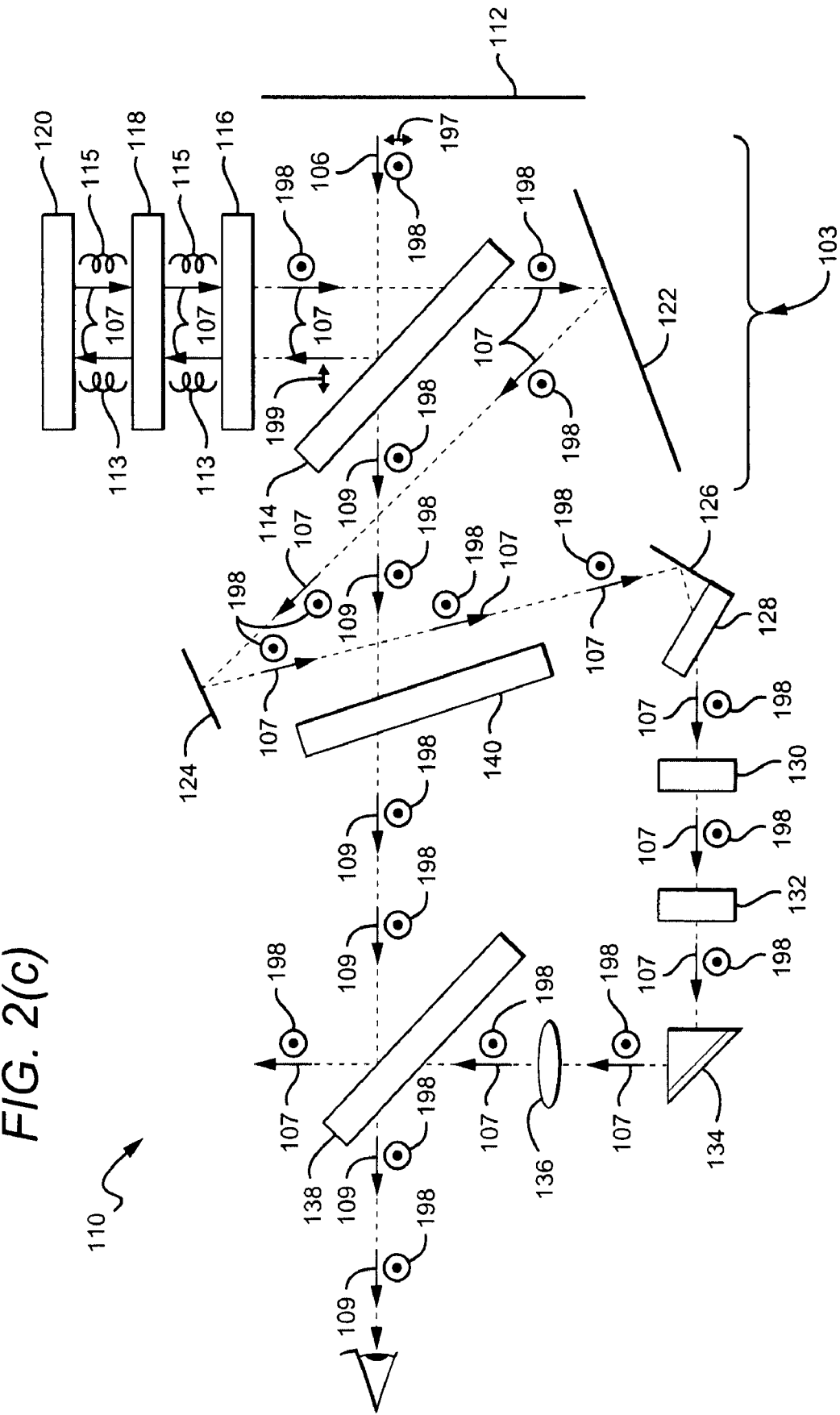

FIGS. 2(b) and 2(c) depict the two fields of view selectable by the user. FIG. 2(b) shows the magnified field of view as defined by the path taken by light ray 107, and FIG. 2(c) depicts the unmagnified field of view (0×) as defined by the path taken by light ray 109.

The two fields of view are preferably established by subsystem 103, which comprises spheroid 120, aberration corrector 118, quarter-wave plate 116, wire-grid polarizer 114 and mirror 122. Wire-grid polarizer 114 receives input light ray 106, which is comprised of two linear polarization states 197 and 198. In this example, wire-grid polarizer 114 transmits polarization state 198 as light ray 109, and reflects polarization state 197 as light ray 107, whose polarization state changes to polarization state 199 because of the wire-grid polarizer's reflection. Light ray 109 transmits through wire-grid polarizer 114 and exits subsystem 103. Light ray 107, on the other hand, is reflected to quarter-wave plate 116, which circularly polarizes the ray to polarization state 113. Light ray 107 then travels through corrector 118, and spheroid 120. Spheroid 120 serves as a reflective objective, and reflects output light 107 with a circularly polarized state 115. The circularly polarized light traverses through corrector 118 and then through quarter-wave plate 116, which converts the circularly polarized light into linearly polarized light with a polarization state 198, which is orthogonal to polarization state 199. Since wire-grid polarizer 114 transmits light of polarization state 198 in this example, light ray 107 passes through wire-grid polarizer 114 and reflects off of mirror 122 and exits subsystem 103. The output of subsystem 103 comprises light rays 107 and 109, both with polarization state 198. In this manner, subsystem 103, in addition to creating two separate light ray paths, provides a reflective objective.

Upon exiting subsystem 103, light ray 109 transmits without magnification onto liquid crystal 140. Light ray 107, on the other hand, exits subsystem 103 and reflects off of mirrors 124 and 126 and through aberration corrector 128. Mirrors 122, 124 and 126 provide beam folding, which allows for a shorter scope length. Other beam folding arrangements are also possible. Light ray 107 then passes through field lens 130, and onto switchable liquid crystal 132.

FIG. 2(b) shows liquid crystals 132 and 140 in the activated state. In this state, liquid crystals 132 and 140 rotate the polarization state of input light rays 107 and 109, respectively, from the transmitive polarization state 198 to the reflective polarization state 197. Wire-grid polarizer 138 reflects both rays 107 and 109, so that ray 109 is reflected away from the field of view and blocked from reaching the eye, while ray 107 is reflected into the field of view, but only after first being reflected by prism 134 and movable ocular 136, which magnifies the image formed by the objective of the telescope, and also provides an adjustable focus. Prism 134 is preferably an Amici Roof prism, although other prisms with other mirror combinations may also be used. Since ray 109 is unmagnified and ray 107 is magnified, activating the liquid crystals 132 and 140 displays the magnified field of view, and deflects away the unmagnified light ray 109.

FIG. 2(c) shows liquid crystals 132 and 140 in the deactivated state. In this state, liquid crystals 132 and 140 do not rotate the polarization state of input light rays 107 and 109, respectively, so that the rays retain their transmitive polarization state 198. Wire-grid polarizer 138 receives and transmits both ray 107 and 109, since the polarizer transmits light of polarization state 198. Light ray 107 is transmitted out of the field of view and thus does not reach the viewer's eye, while ray 109 is transmitted along the field of view. Since ray 109 is not magnified, deactivating liquid crystals 132 and 140 displays the 0×, or unmagnified field of view.

This embodiment allows for compactness and field of view selection without any moving parts, thereby reducing weight and complexity. Although a liquid crystal and polarizer are shown in this embodiment, a switchable polarizer may also be used. Additionally, a lens or mirror can be used in place of the spheroid/corrector, and the liquid crystal cells can be placed elsewhere in the housing.

Figure 3A:
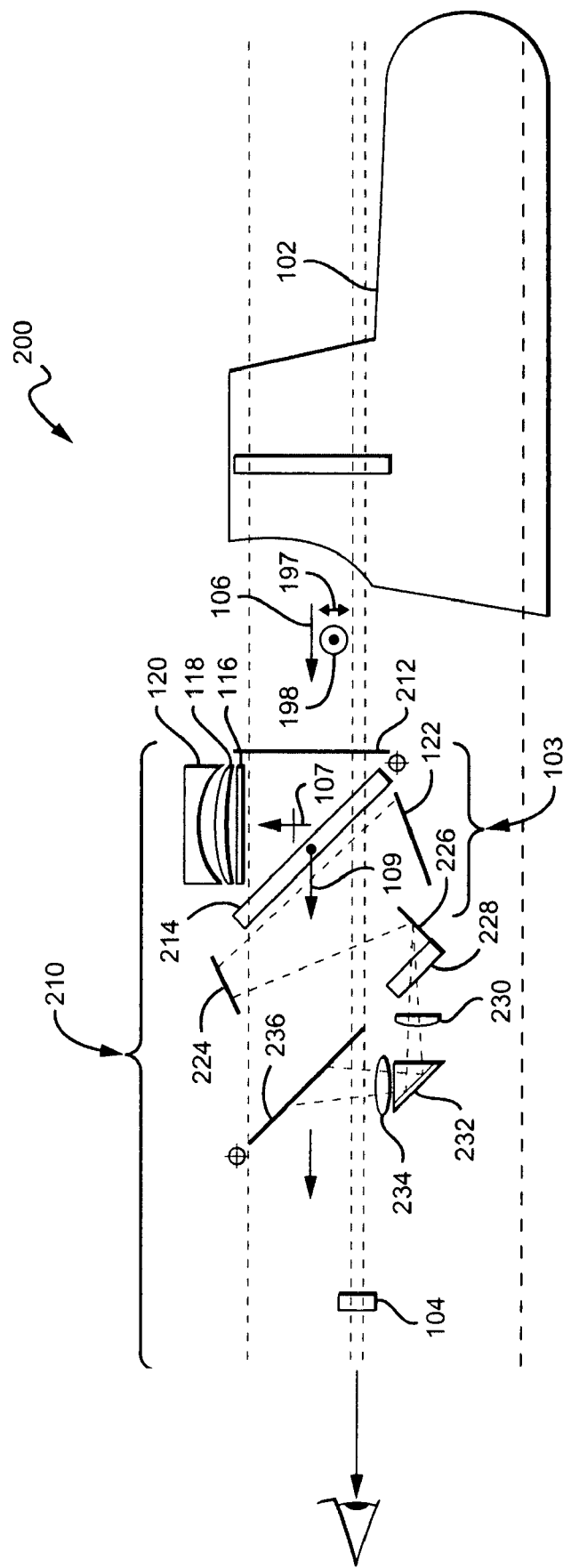
FIGS. 3(a), 3(b) and 3(c) are schematic diagrams illustrating a flip-mirror and flip-polarizer for selecting a field of view.

FIG. 3(a) shows another embodiment of the dual field of view sighting system. In this embodiment, the light path selection mechanism comprises a flip-mirror 236 and flip-polarizer 214 that flip between interception and non-interception modes.

Figure 3B:
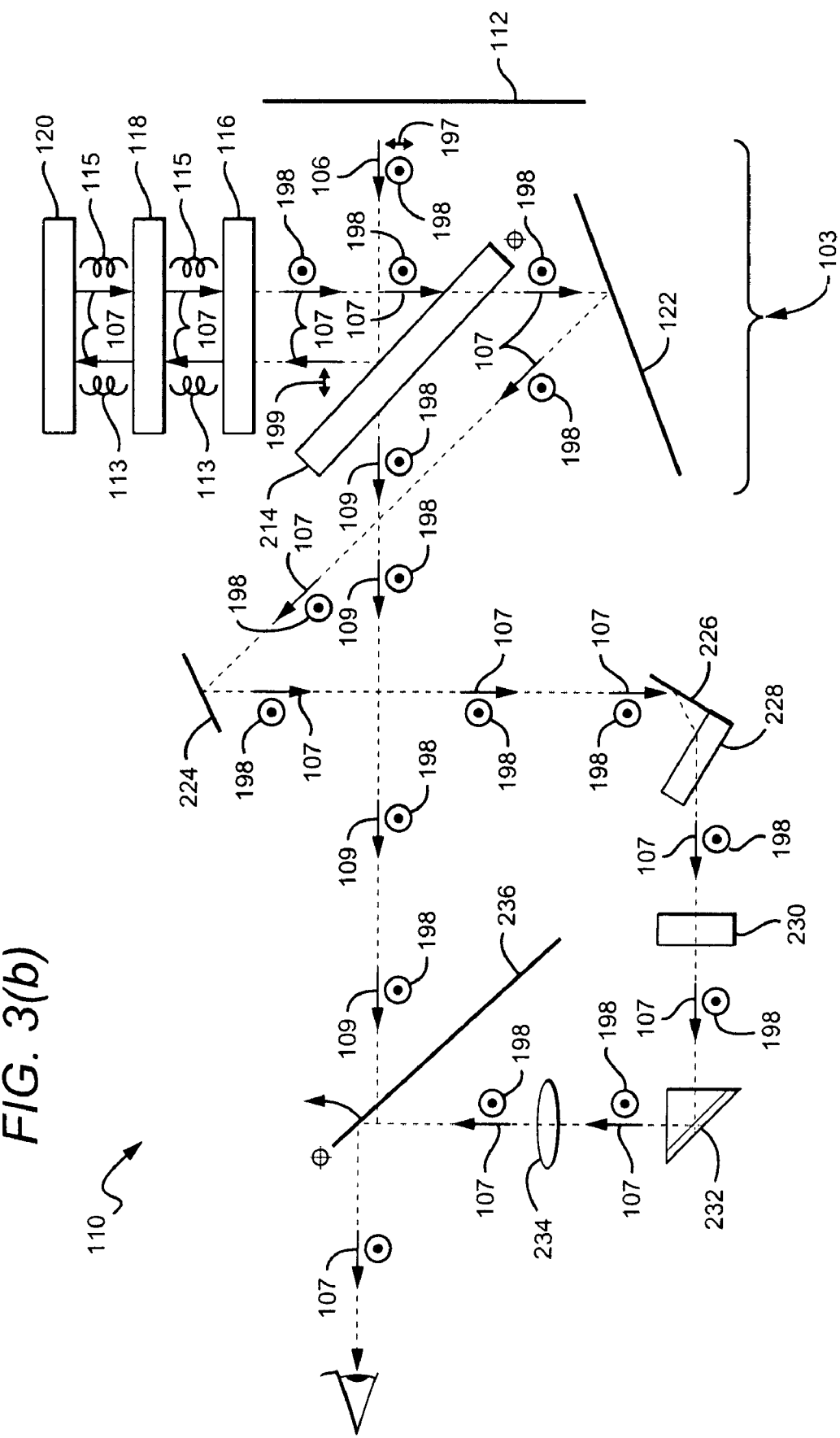

FIG. 3(b) shows flip-mirror 236 and flip-polarizer 214 positioned in the interception mode. When flip-polarizer 214 is in the interception mode, subsystem 103 operates as described in a previous embodiment: the flip-polarizer 214 intercepts input light to create two fields of view defined by the path created by light ray 107 and by light ray 109, which both exit subsystem 103 with a polarization state 198. In this embodiment, unmagnified light ray 109 traverses through housing 210, but is blocked by flip-mirror 236, and hence does not exit the sight. Light ray 107 is diverted by mirrors 122, 224 and 226 into aberration corrector 228 and through field lens 230. Light ray 107 is then reflected by prism 232, which is preferably an Amici Roof Prism, although other prisms with other mirror combinations may also be used. Prism 232 reflects light ray 107 through adjustable ocular with focus 234 and onto flip-mirror 236, which outputs light ray 107 out of the sight. Because the output light ray 107 travels through a telescope defined by reflective objective spheroid 120, corrector 118, aberration corrector 228, field lens 230, prism 232 and adjustable ocular with focus 234, placing the flip-mirror 236 and flip-polarizer 214 in the interception mode displays a magnified field of view.

Figure 3C:
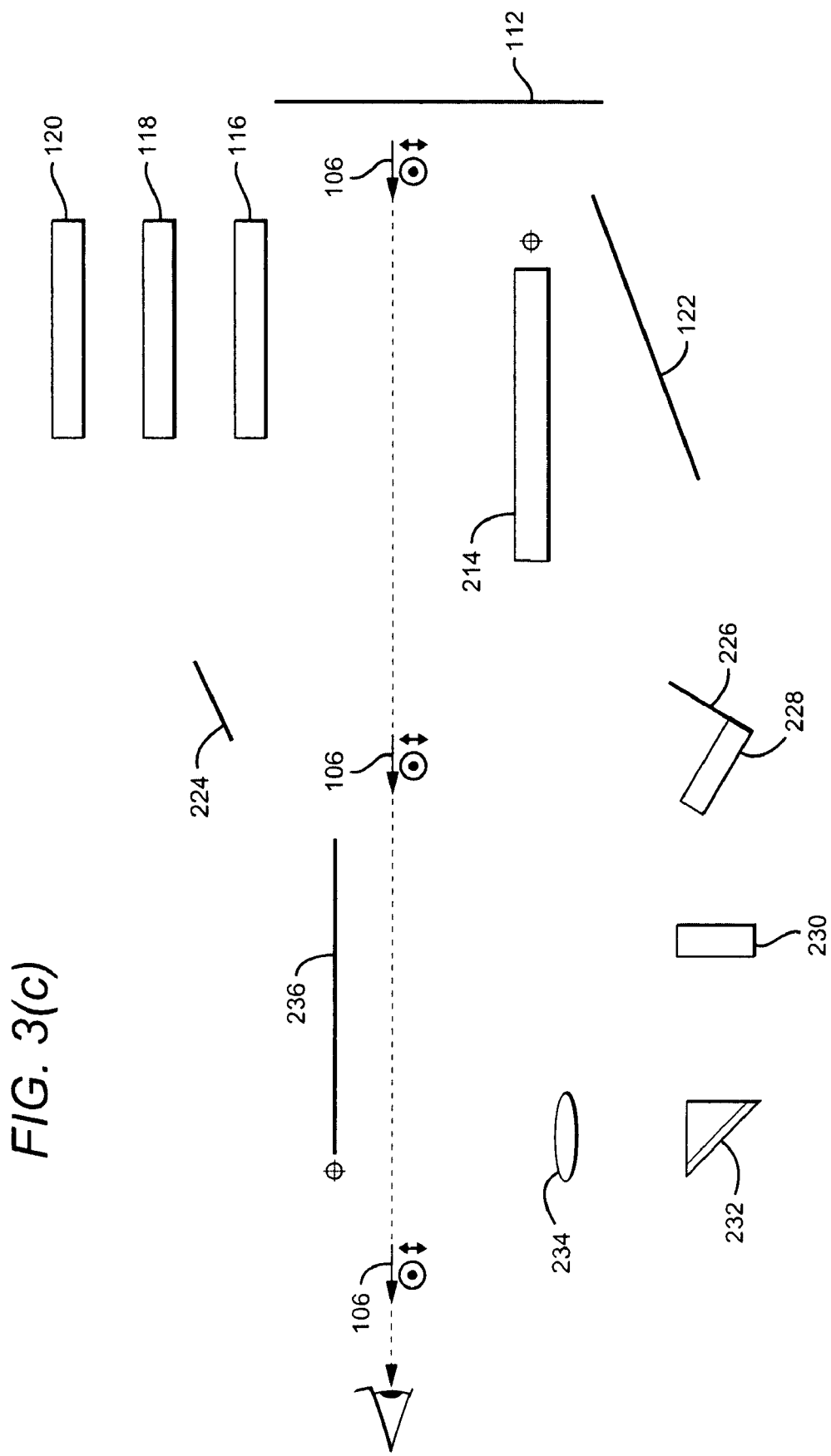

FIG. 3(*c*) shows flip-mirror 236 and flip-polarizer 214 flipped to the non-interception mode, wherein they do not intercept input light 106. In this state, input light 106 is not diverted into a telescope system, but is transmitted straight through, and hence emerges from the sight without any magnification to provide an unmagnified field of view.

The embodiment depicted in FIGS. 3(*a*)-(*c*) allows for compact design and polarized light glare rejection in the 4× state, as well as an on-axis primary in a short optical design.

Figure 4A:
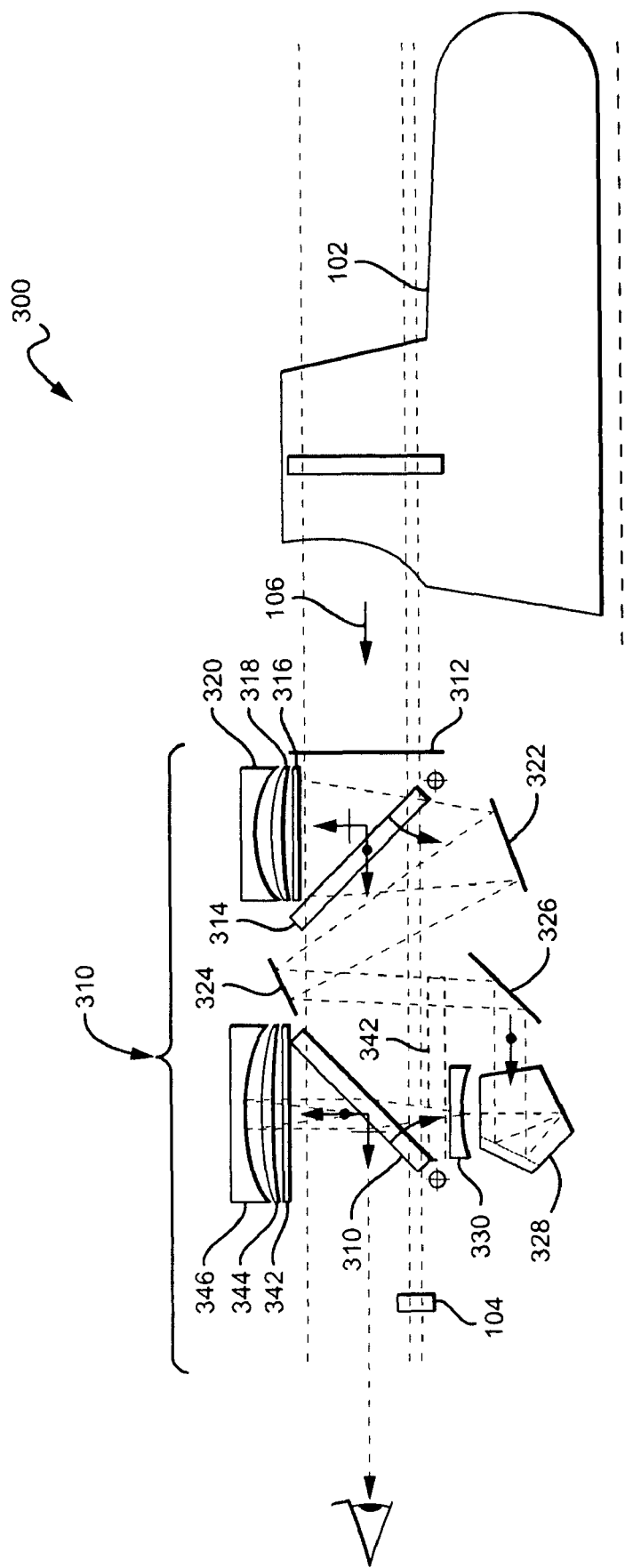
FIGS. 4(a), 4(b) and 4(c) are schematic diagrams illustrating flip-polarizers for selecting a field of view.
Figure 4B:
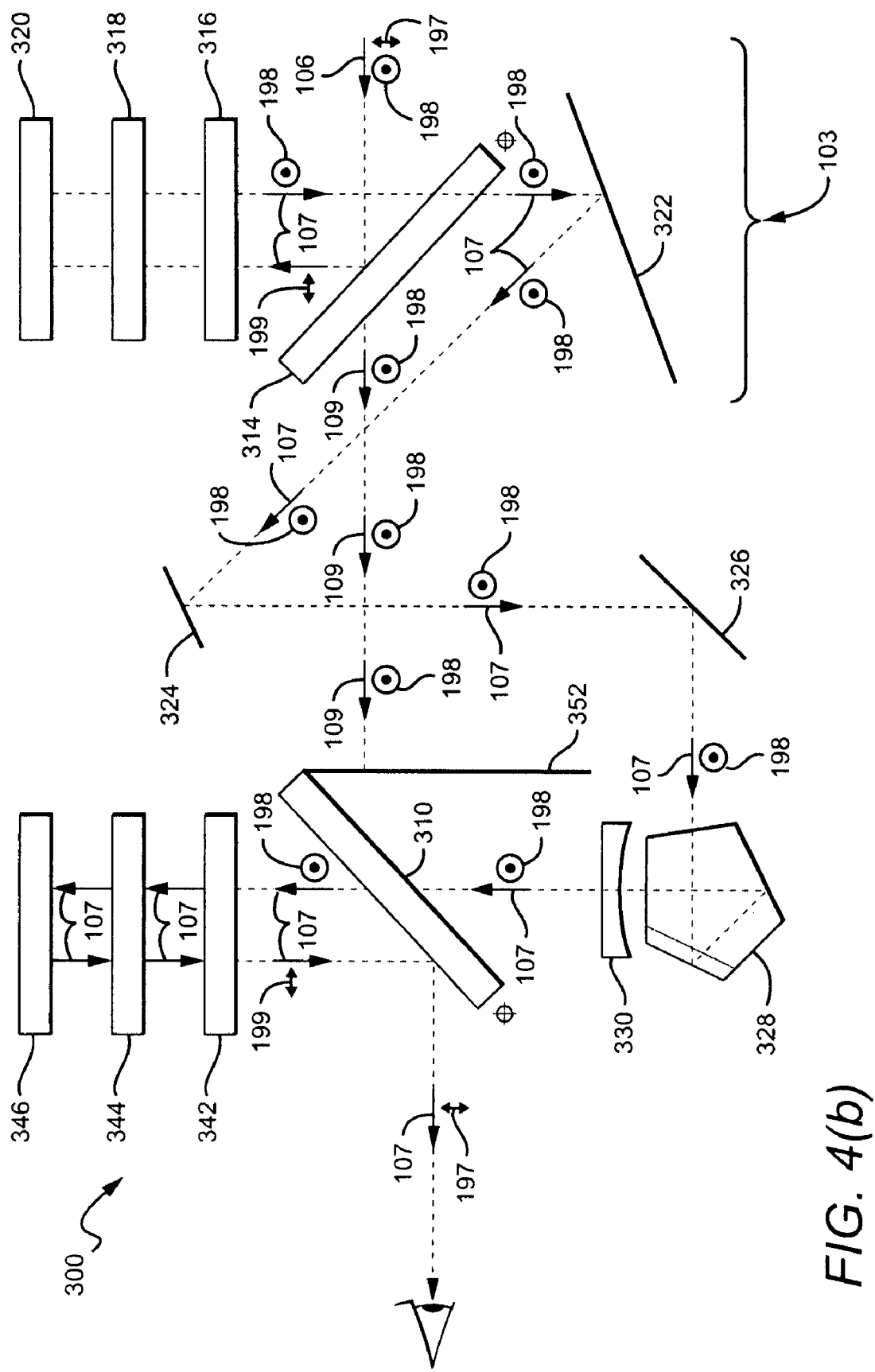
Figure 4C:
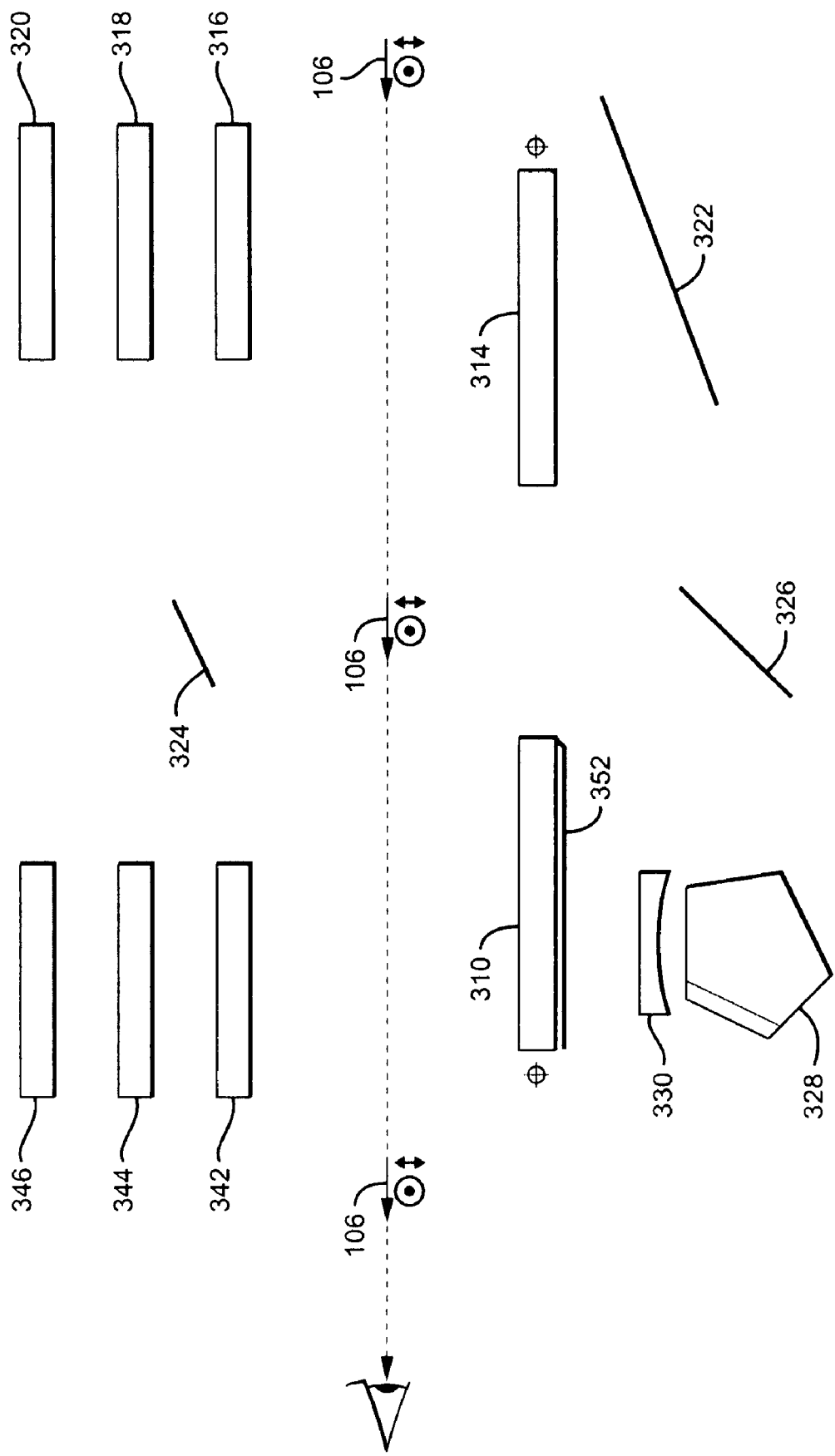

FIG. 4(*a*) shows another embodiment of the dual field of view sighting system. In this embodiment, the light path selection mechanism comprises flip-polarizers 310 and 314, which flip in conjunction to switch between interception and non-interception modes. The compact polarization based reflective arrangement can be used for both the objective and ocular of the magnification path in this embodiment.

In the example shown in FIG. 4(*b*), flip-polarizers 310 and 314 are positioned in the interception mode to transmit light of polarization state 198 and reflect light of polarization state 197. Input light 106 having polarization states 197 and 198 enters subsystem 103, which as discussed in a previous embodiment, outputs light rays 107 and 109, both having polarization state 198. Ray 109 transmits along the light of sight, but is blocked by curtain 352, and thereby blocked from view. Ray 107 reflects off of mirrors 322, 324 and 326, which fold the light beam to reduce the overall length of the sight. Mirror 326 reflects light ray 107 into prism 328, which is illustrated as a pentaprism, although other prisms with other mirror combinations that may be used. Prism 328 reflects ray 107 through field lens 330 and onto a second wire-grid polarizer 310, which transmits light of polarization state 198 and reflects light of polarization state 197. Since the polarization state of ray 107 is 198, it transmits through wire-grid polarizer 310 and is incident on quarter-wave plate 342, which circularly polarizes the light. Ray 107 then travels through corrector 344 and is reflected by spheroid 346, which serves as a reflective ocular, back through corrector 344 and onto quarter-wave plate 342, which converts the polarization of light ray 107 into a linear polarization state 199. Ray 107 is then incident on wire-grid polarizer 310, which reflects the light out of the sight toward the eye of the viewer. Since exiting ray 107 experiences magnification, placing the flip-polarizers 310 and 314 in the interception mode produces a magnified field of view.

FIG. 4(*c*) shows flip-polarizers 310 and 314 in the non-interception mode, wherein the flip-polarizers are flipped down so that input light 106 is not intercepted and therefore not diverted into a telescope system, but is transmitted straight through, and hence emerges from the sight without magnification to provide an unmagnified field of view. In this example, curtain 352 folds under flip-polarizer 310, to which it is preferably attached, when the flip-polarizer is "flipped" into the non-interception mode, and hence does not obstruct input light ray 106. Other methods for hiding the curtain 352 in this mode are also possible, including those that do not attach curtain 352 to flip-polarizer 310.

The embodiment depicted in FIGS. 4(*a*)-(*c*) results in a compact design both in height and length by allowing the sight to fit between the front and rear BUIS and sit closer to the Picatinney rail (not shown), and allows for eye relief in 4× mode, which is provided by rotating broadband half-wave plate 312. It also allows for polarized light glare rejection in the 4× mode. Although this embodiment depicts objective and ocular spheroid/correctors, these elements can be replaced by a lens/mirror combination.

FIG. 5(*a*) shows another embodiment of the dual field of view sighting system. In this embodiment, the light path selection mechanism comprises two off-axis flip spheroids 420 and 430 to select between two fields of view, and to preferably provide aberration correction, although such correction may be performed by other elements, if necessary. LED illuminated reticle 427 and semi-reflective lens 440 combine to project a red dot, and in this example are included within housing 410. However, an external reflex sight can be used in place of 427 and 440 to provide the same red dot.

FIG. 5(*b*) shows the off-axis flip spheroids in the interception mode, wherein they intercept and divert input light ray 106 through a magnification system. Ray 106 enters housing 410 and is first reflected and magnified by off-axis flip spheroid 420, which serves as a reflective objective that diverts light ray 106 onto mirror 450. Mirror 450 then reflects ray 106 through prism 460, which is preferably an Abbe-Koening prism, although other image inverters/prisms with other mirror combinations can also be used. Ray 106 travels through field lens 470 and is then reflected by mirror 480 onto off-axis flip spheroid 430, which serves as a reflective ocular that re-directs light ray 106 out of the sight for viewing. Since ray 106 is magnified by the off-axis flip spheroids 420 and 430, positioning the spheroids in the interception mode as shown in FIG. 5(*b*) produces a magnified field of view.

FIG. 5(*c*) shows off-axis flip spheroids flipped to the non-interception mode, so that light ray 106 transmits through housing 410 without experiencing any magnification, providing an unmagnified field of view.

The embodiment depicted in FIGS. 5(*a*)-(*c*) provides high light transmission since no polarizer is used in either 0× or 4× modes, and provides a compact sight, which can be compacted further by integrating the red dot sight and dual field of view sight together.

FIG. 6(*a*) shows another embodiment of a dual field of view sighting system. In this embodiment, the light path selection mechanism comprises an off-axis reflective objective flip-spheroid like the previous embodiment, but which uses flip mirror 530 instead of a second off-axis flip spheroid. In the interception mode, off-axis flip spheroid 520 and flip mirror 530 are positioned to intercept and reflect input light as shown. Light ray 106 enters housing 510 and is reflected by off-axis flip spheroid 520, which acts as a reflective objective and diverts ray 106 onto mirror 525 for reflection into prism 527, which is preferably an Abbe-Koening prism, although other prisms with other mirror combinations are also possible. The prism 527 sends the light through field lens 529 and onto off-axis spheroid 532, which does not flip. Spheroid 532 reflects the light onto flip-mirror 530, which reflects light ray 106 out of the sight and into the field of view. Since light ray 106 experiences magnification, placing mirror 530 and spheroid 520 in the interception mode produces a magnified field of view. Preferably, the off-axis spheroids self-correct for aberrations, although this may be accomplished using other elements, if necessary.

Figure 6B:
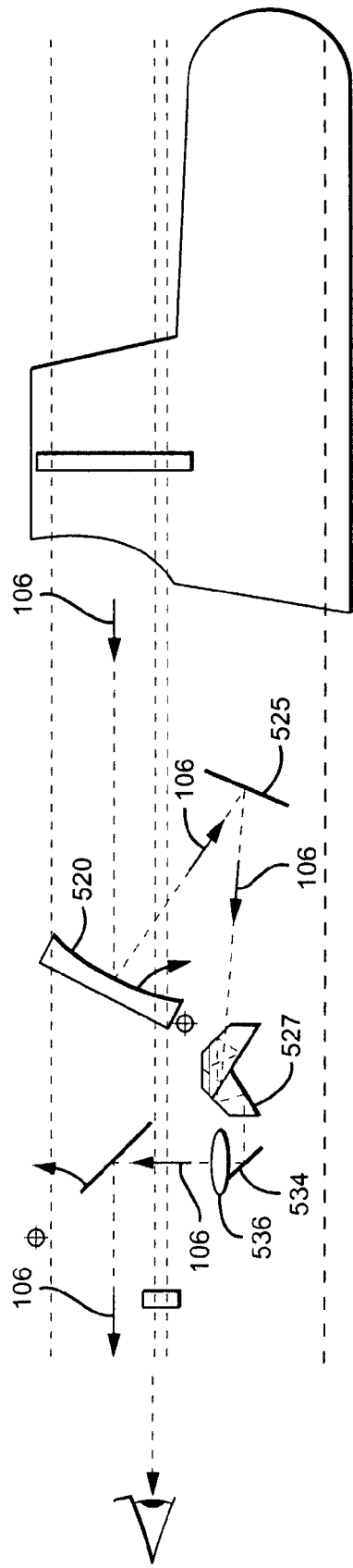
Figure 7:
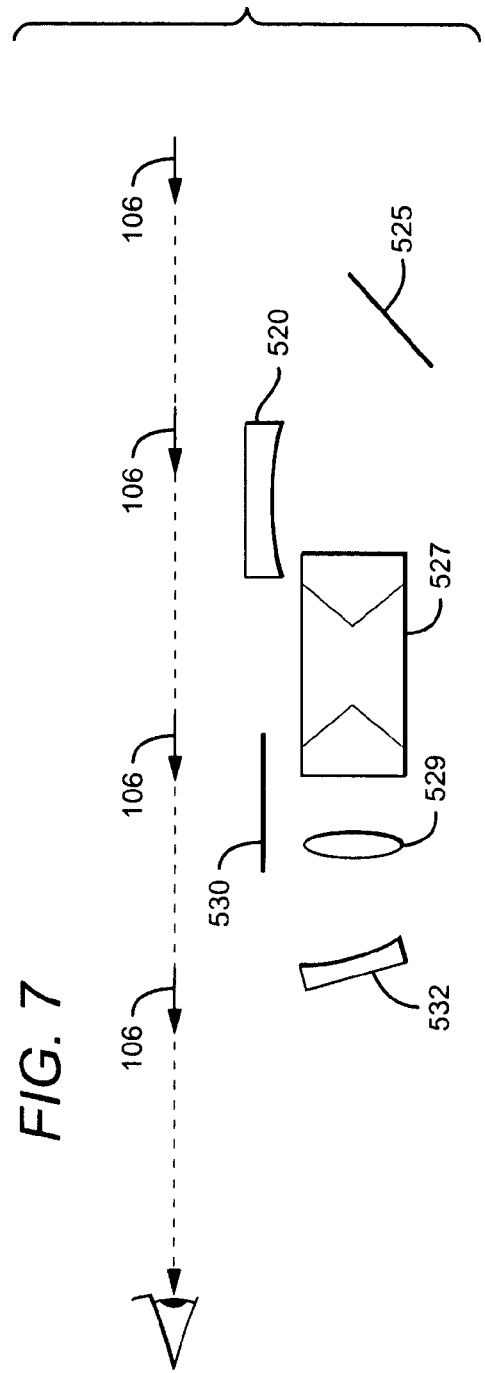

FIG. 6(b) shows a variation on the mirror/off-axis flip spheroid embodiment of FIG. 6(a). In this variation, the off-axis spheroid 532 is replaced by mirror 534 for reflecting ray 106 onto ocular with adjustable focus 536, which moves vertically instead of horizontally, resulting in a more compact design. FIG. 7 shows the non-interception mode.

The embodiment depicted in FIGS. 6(a)-(b) and 7 results in high light transmission due to the lack of a polarizer in 0× or 4× states.

Figure 8:
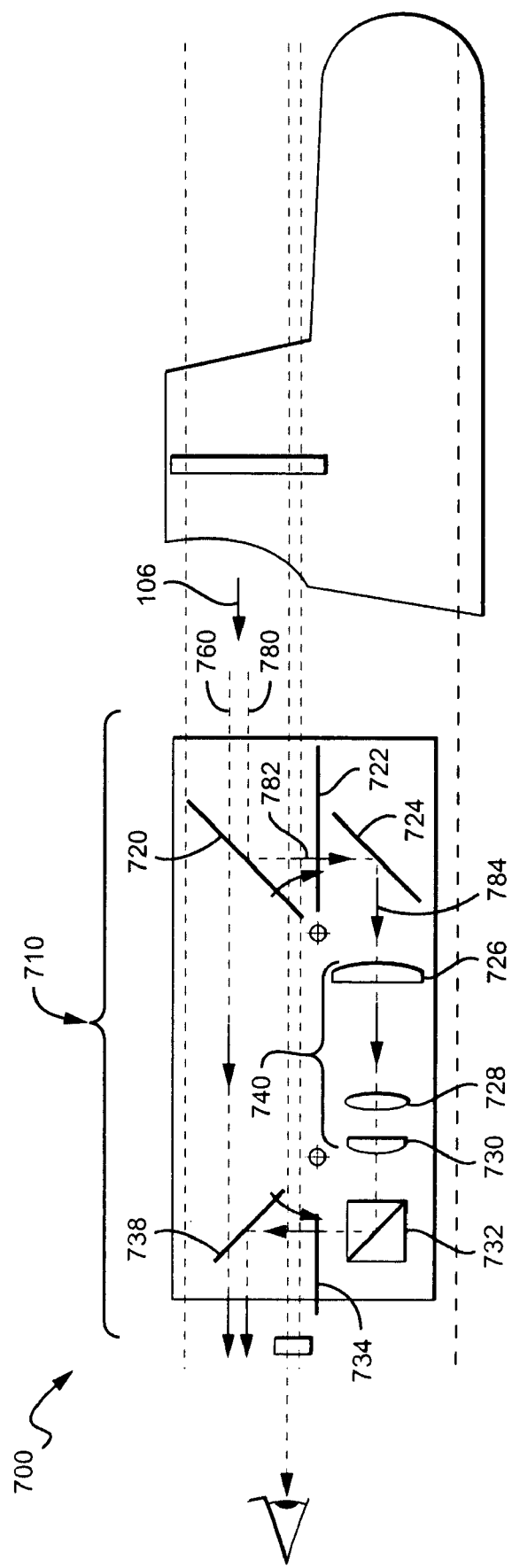

FIG. 8 shows another embodiment of a dual field of view sighting system. In this embodiment, the light path selection mechanism comprises two flip mirrors 720 and 738. The flip mirrors divert light when they are positioned the interception mode, as shown, or allow light transmission when flipped or rotated to the non-interception mode, as depicted by positions 734 and 722. In the interception mode, mirror 720 reflects input light 106 first along light path 782 and onto mirror 724, which then reflects the light from light path 782 along light path 784 and into magnification system 740. This magnification system is preferably composed of an objective lens 726, field lens 728 and ocular 730 to produce a 4× magnification. However, other magnification levels and lenses/lens arrangements for the telescope are also contemplated.

FIG. 9(a) depicts another embodiment of a dual field of view sighting system. In this embodiment, the path selection mechanism comprises flip-mirrors 812 and 824 like the previous embodiment, except that the magnification elements are arranged differently within housing 810. Light ray 106 enters housing 810 and is reflected by flip-mirror 812 when the flip-mirror is in the interception mode, causing it to divert ray 106 into objective lens 814 and then to mirror 816, which sends the light to prism 818. Prism 818 is preferably a Porro-Abbe prism, although other prisms with other mirror combinations may also be used. The prism 818 reflects light to adjustable ocular with focus 820, and then onto mirror 824, which reflects the light outside the sight for viewing. A field lens (not shown) may also be disposed along the light path between mirror 816 and ocular with adjustable focus 820. Since mirrors 824 and 812 divert light through a magnification system, positioning them in the interception mode produces a magnified field of view. As with the previous embodiment, when flip-mirrors 812 and 824 are "flipped" or rotated to the non-interception mode shown as positions 813 and 825, respectively, light 106 is not reflected or diverted through the magnification system, and thus an unmagnified field of view is produced. This design has high light transmission, a wide 4× field of view, and low cost.

FIG. 9(b) shows another embodiment that utilizes flip-mirrors like the previous embodiment, but folds the light path in a different manner. When mirrors 836 and 812 are rotated to the interception mode, light ray 106 enters housing 810 and is reflected by mirror 812 through objective lens 814, which magnifies and transmits ray 106 across mirrors 816, 826, and 838, all of which help fold the beam path to reduce the overall length of the device. Light ray 106 then passes through field lens 834 and is reflected by mirror 828 and prism 830, which is preferably an Amici Roof prism, although other prisms with other mirror combinations may be used. Ray 106 leaves prism 830 and passes through adjustable ocular with focus 832 and onto flip-mirror 836, which directs the light out of the sight and into the viewer's field of view. Since mirrors 836 and 812 divert light through a magnification system, rotating them to an interception mode produces a magnified field of view. As with the previous embodiment, rotating mirrors 836 and 812 to positions 817 and 819, respectively, does not divert input light 106 through a magnification system, and thus produces an unmagnified field of view. This design produces high light transmission, with a wide 4× field of view for a low cost.

FIG. 9(c) shows another embodiment of the dual field of view sighting system that uses flip mirrors 836 and 812 like the previous embodiment to select between fields of view, but uses prism 840 to reflect ray into field lens 842, before being reflected by mirror 841 through adjustable ocular with focus 832; mirror 836 reflects the light ray out of the sight for viewing when the flip-mirrors are in the interception mode. This design produces high light transmission, with a wide 4× field of view for a low cost.

FIG. 9(d) shows another embodiment of the dual field of view sighting system which, like the previous embodiment, uses flip-mirrors 812 and 852 as part of its light path selection mechanism, but which uses an off-axis objective 844 and which positions mirrors 816, 854, and 856 so that the beam of light is folded backward, onto itself, before traveling through field lens 846 and being reflected by prism 848 through ocular with adjustable focus 850. Prism 848 is preferably a Pentaprism, although other prisms with other mirror combinations are also possible. When the flip-mirrors are rotated to the interception mode as shown in FIG. 9(d), light ray 106 is first reflected by flip-mirror 812 through objective lens 844 onto mirror 856, which in turn reflects the light ray to mirror 854. Mirror 854 then reflects light ray 106 backwards to mirror 816, which reflects the light ray through field lens 846 and through prism 848. This prism reflects the ray through adjustable ocular with focus 850 and onto flip-mirror 852, which reflects the light out of the sight and into the field of view. As with the previous embodiment, this design produces high light transmission, with a wide 4× field of view for a low cost.

For the embodiments shown in the Figures and discussed herein, input light 101 preferably enters reflex sight 102 and exits with a projected red dot as light 106, although the external reflex sight may be replaced by internal elements within the housing that project the red dot. The BUIS 104, housing 110 and reflex sight 102 are preferably arranged in the manner shown in FIG. 1(a) or 1(b). The BUIS comprises a rear BUIS and a front BUIS (not shown).

Although a particular arrangement may be depicted in each Figure, other arrangements and mounting apparatuses are also contemplated. For example, housing 110 may be used alone, without reflex sight 102, for selecting between two different light paths. Additionally, though reflex sight 102 is disposed outside of the housing for most embodiments, it can also be placed within the housing to shorten the overall size of the whole sighting system. The overall sight length can be less than 8 inches for the compact design, although other lengths are also possible. Additionally, each of the embodiments shown may select between combinations of magnification levels other than 0× and 4×. For example each embodiment may provide for selecting between 2× and 4×, or any other combination of magnification levels. The liquid crystals shown in various embodiments may be disposed in a location other than that depicted in the embodiment. Back-up iron sights are also preferably visible in the 0× state as emergency backup if the sight fails. The transmission of undiverted path is preferably higher than 80%, and transmission of a polarized diverted path higher than 20%, but other design variations are also possible.

Although particular elements are shown in each of the embodiments, other elements may also be used. The specific prisms shown in the Figures can be replaced by other prisms and mirror combinations that have similar functionality. For example, a Roof Pechan prism is also contemplated for each of the embodiments that use prisms. Beam folding elements are not limited to the mirror-arrangements shown in the embodiments, and placement of the liquid crystal elements can be changed to achieve the same effect. The polarizers shown in various embodiments may be replaced by beam splitters. Aberration correctors, where used, can comprise refractive aberration correctors. Additionally, the reflective objective and/or reflective ocular are preferably fixed. The movable elements are preferably internally located lightweight objects. Large, external elements preferably need not be moved when switching between fields of view.

Although some of the embodiments show wire-grid polarizers as reflecting and transmitting a particular polarization state, they can reflect/transmit other orthogonal polarization state combinations as well, and are not bound to reflect/transmit only the specific states shown. Although selection between two light paths is shown, additional light paths may also be selected from. Other ways to switch, flip or rotate elements are also contemplated, including rotation about any axis in any plane, mechanical translation in any direction, and/or any combination thereof, of any element. The elements can be flipped through various electrical and mechanical means, such as pushing a button or turning a knob.

While various implementations and embodiments of the dual field of view system have been described, it will be apparent to those of ordinary skill in the art that many more are possible.

What is claimed is:

1. A dual field of view sighting system, comprising:
   a light path selection mechanism comprising a polarizer that receives input light and, in a first mode, outputs an undiverted light along an undiverted optical path and, in a second mode, diverts said input light to output a diverted light along a diverted optical path,
   a magnification system positioned to magnify an image along one of said optical paths but not the other optical path, and
   a reflective objective comprising a concave spheroid mirror positioned to receive and reflect light through a quarter-wave plate.

2. The system of claim 1, wherein said mechanism outputs an unmagnified field of view when in said first mode and outputs a magnified field of view when in said second mode.

3. The system of claim 1, wherein said light path selection mechanism further comprises a plurality of activatable liquid crystal cells having a first state corresponding to said first mode and a second state corresponding to said second mode.

4. The system of claim 3, wherein said liquid crystal cells are activated in one of said states and deactivated in the other of said states.

5. The system of claim 1, wherein said polarizer flips to switch between said first and second modes to direct said input light between said diverted and undiverted optical paths.

6. The system of claim 5, wherein said flips comprises rotation about an axis.

7. The system of claim 5, wherein said flips comprises a combination of mechanical translation and rotation.

8. The system of claim 5, wherein in said first mode said polarizer is positioned to not intercept said input light and in said second mode, said polarizer is positioned to intercept said input light.

9. The system of claim 8, further comprising a rotatable mirror that rotates in conjunction with said polarizer.

10. The system of claim 1 further comprising a refractive aberration corrector element disposed between said quarter-wave plate and said concave spheroid mirror.

11. A dual field of view sighting system, comprising:
    a light path selection mechanism comprising a polarizer that receives input light and, in a first mode, outputs an undiverted light along an undiverted optical path and, in a second mode, diverts said input light to output a diverted light along a diverted optical path, and
    a magnification system positioned to magnify an image along one of said optical paths but not the other optical path, and
    a reflective ocular comprising a concave spheroid mirror positioned to receive and reflect light through a quarter-wave plate.

12. The system of claim 11, further comprising a refractive aberration corrector element disposed between said quarter-wave plate and said concave spheroid mirror.

13. The system of claim 11, wherein said light path selection mechanism further comprises a plurality of activatable liquid crystal cells having a first state corresponding to said first mode and a second state corresponding to said second mode.

14. The system of claim 13, wherein said liquid crystal cells are activated in one of said states and deactivated in the other of said states.

15. The system of claim 11, wherein said polarizer flips to switch between said first and second modes to direct said input light between said diverted and undiverted optical paths.

16. The system of claim 15, wherein said flips comprises rotation about an axis.

17. The system of claim 15, wherein said flips comprises a combination of mechanical translation and rotation.

18. The system of claim 15, wherein in said first mode said polarizer is positioned to not intercept said input light and in said second mode, said polarizer is positioned to intercept said input light.

19. The system of claim 18, further comprising a rotatable mirror that rotates in conjunction with said polarizer.

20. A dual field of view sighting system, comprising:
    a light path selection mechanism comprising a plurality of flippable reflectors that flip to direct said input light between said diverted and undiverted optical paths and that receives input light and, in a first mode, outputs an undiverted light along an undiverted optical path and, in a second mode, diverts said input light to output a diverted light along a diverted optical path, and
    a magnification system positioned to magnify an image along one of said optical paths but not the other optical path,
    wherein said rotatable interceptors comprise rotatable off-axis spheroids.

21. The system of claim 20, wherein in said first mode, said reflectors are positioned to not intercept said input light and in said second mode, said interceptors are positioned to intercept said input light.

22. The system of claim 20, wherein said rotatable interceptors further comprises a rotatable mirror.

23. The system of claim 20, wherein said light path selection mechanism comprises a plurality of non polarizing beam splitters.

24. An optical subsystem, comprising:
    a polarizer for receiving input light and outputting a diverted light having a first polarization state and a transmitted light having a second polarization state;
    a broadband quarter-wave plate for receiving said diverted light from said polarizer and outputting said diverted light with a circular polarization state; and a concave spheroid mirror positioned to receive and reflect said diverted light back to said quarter-wave plate, wherein said quarter-wave plate converts said circular polarization state of said diverted light to said second polarization state for transmission through said polarizer.

25. The system of claim 24, wherein said polarizer comprises a wire-grid polarizer.

26. The system of claim 24, further comprising an aberration corrector disposed between said quarter-wave plate and said spheroid.

27. The system of claim 24, wherein said spheroid comprises a reflective objective lens of a telescope.

28. A method for providing a dual field of view sighting system comprising:
   providing diverted and undiverted optical paths;
   magnifying an image along one of said optical paths but not the other; and
   selecting between said diverted and undiverted optical paths,
   wherein said magnifying comprises transmitting light in said diverted optical path through an objective and ocular, at least one of which is reflective.

29. The method of claim 28, further comprising receiving an input light and, in a first mode, outputting an undiverted light along an undiverted optical path and, in a second mode, diverting said input light to output a diverted light along said diverted optical path.

30. The method of claim 28, further comprising transmitting one polarization state of said input light along said undiverted optical path and reflecting an orthogonal polarization state of said input light using a polarizer.

31. The method of claim 30, wherein said selecting comprises switching liquid crystal cells to transmit light of one optical path but not the other.

32. The method of claim 30, wherein said selecting comprises rotating said polarizer.

33. The method of claim 28, further comprising intercepting and guiding said input light along said diverted optical path using a plurality of reflectors.

34. The method of claim 33, wherein said selecting comprises rotating a first set of said plurality of reflectors.

35. The method of claim 28, wherein said reflective objective and/or ocular comprises a quarter-wave plate and concave spheroid mirror.

36. The method of claim 28 further comprising correcting for refractive aberrations.

37. A method for creating two light paths, comprising:
   receiving input light;
   reflecting a reflective polarization state of said input light along a diverted path as a diverted light ray;
   transmitting a transmitive polarization state of said input light along an undiverted path as an undiverted light ray; and
   sending said diverted light ray to a reflective objective,
   wherein said reflective objective comprises a concave spheroid and a quarter-wave plate.

38. The method of claim 37, wherein said receiving, reflecting and transmitting is performed by a polarizer.

* * * * *